United States Patent
Lu et al.

(10) Patent No.: US 9,328,719 B2
(45) Date of Patent: May 3, 2016

(54) METHOD OF CALCULATING AVAILABLE OUTPUT POWER OF WIND FARM

(71) Applicants: State Grid Corporation of China, Beijing (CN); Gansu Electric Power Company of State Grid, Lanzhou (CN); Wind Power Technology Center of Gansu Electric Power Company, Lanzhou (CN); Tsinghua University, Beijing (CN)

(72) Inventors: Liang Lu, Beijing (CN); Ning-Bo Wang, Beijing (CN); Ying Qiao, Beijing (CN); Zong-Xiang Lu, Beijing (CN); Qing-Quan Lv, Beijing (CN); Long Zhao, Beijing (CN)

(73) Assignees: State Grid Corporation of China, Beijing (CN); Gansu Electric Power Company of State Grid, Lanzhou (CN); Wind Power Technology Center of Gansu Electric Power Company, Lanzhou (CN); Tsinghua University, Beijing (CN)

( * ) Notice: Subject to any disclaimer, the term of this patent is extended or adjusted under 35 U.S.C. 154(b) by 23 days.

(21) Appl. No.: 14/515,530

(22) Filed: Oct. 16, 2014

(65) Prior Publication Data
US 2015/0345474 A1    Dec. 3, 2015

(30) Foreign Application Priority Data
May 29, 2014    (CN) .......................... 2014 1 0231145

(51) Int. Cl.
F03D 9/00    (2006.01)
H02P 9/04    (2006.01)
F03D 7/00    (2006.01)

(52) U.S. Cl.
CPC . *F03D 9/005* (2013.01); *F03D 7/00* (2013.01)

(58) Field of Classification Search
USPC ...................................... 290/44, 55
See application file for complete search history.

(56) References Cited

U.S. PATENT DOCUMENTS

| | | | | |
|---|---|---|---|---|
| 4,203,116 A * | 5/1980 | Lewin | .................. | H01Q 13/206 343/700 MS |
| 7,116,010 B2 * | 10/2006 | Lasseter | .................... | H02J 3/46 307/45 |
| 2004/0051387 A1 * | 3/2004 | Lasseter | .................... | H02J 3/46 307/80 |
| 2012/0004867 A1 * | 1/2012 | Mousavi | ............ | G01R 31/3274 702/58 |
| 2012/0004869 A1 * | 1/2012 | Saarinen | ............ | G01R 31/3274 702/59 |
| 2012/0010830 A1 * | 1/2012 | Saarinen | ............ | G01R 31/3274 702/58 |
| 2015/0200455 A1 * | 7/2015 | Venkateswaran | ...... | H01Q 1/246 342/372 |

* cited by examiner

*Primary Examiner* — Pedro J Cuevas
(74) *Attorney, Agent, or Firm* — Novak Druce Connolly Bove + Quigg LLP

(57) ABSTRACT

A method of calculating available output power of wind farm includes following steps. A space vector $V_k$ is obtained by decomposing a power sequence of benchmarking wind turbines in a wind farm based on empirical orthogonal function. A typical power sequence of the benchmarking wind turbines is calculated by restoring the space vector $V_k$. A total power $P_{total}$ of a feeder on which the benchmarking wind turbines is operated is obtained by enlarging a typical power of each benchmarking wind turbine in proportion according to the quantity of the benchmarking wind turbines operated on the feeder. An output power $P_{estimate}$ of the wind farm is obtained by accumulating the total power $P_{total}$ of all the benchmarking wind turbines.

13 Claims, 1 Drawing Sheet

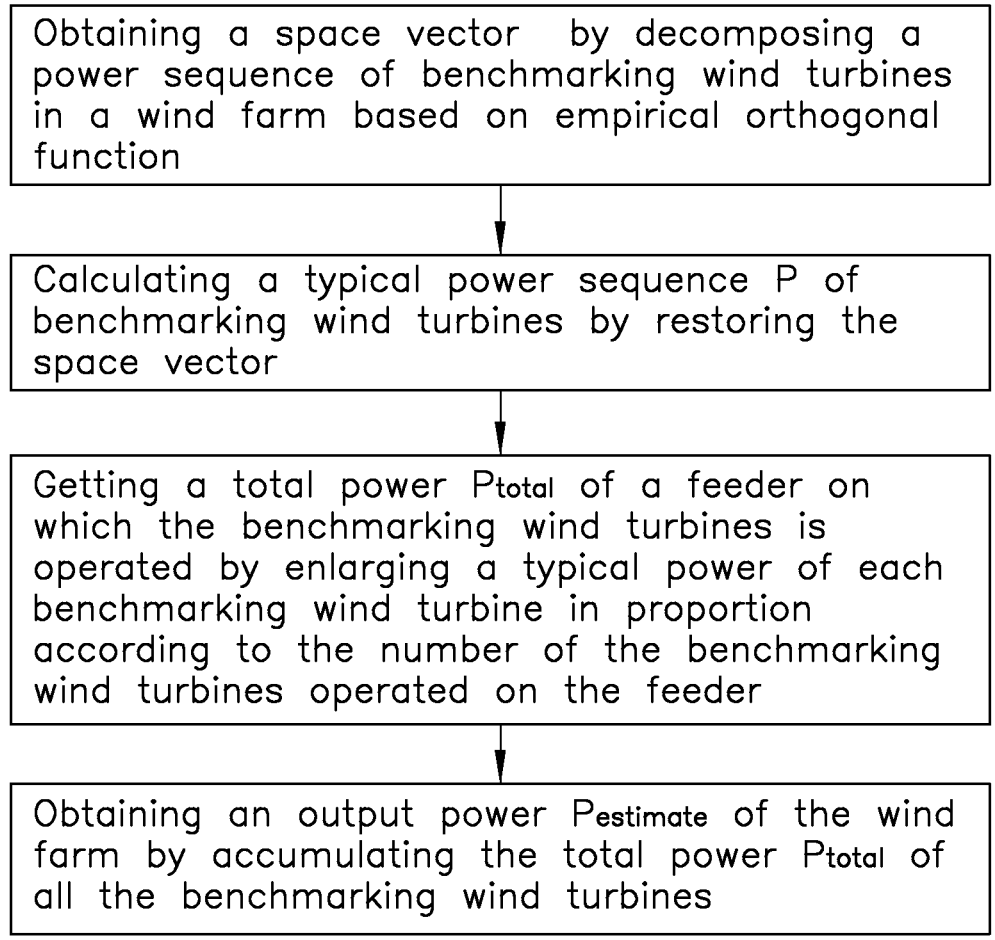

METHOD OF CALCULATING AVAILABLE OUTPUT POWER OF WIND FARM

CROSS-REFERENCE TO RELATED APPLICATIONS

This application claims all benefits accruing under 35 U.S.C. §119 from China Patent Application 201410231145.2, filed on May 29, 2014 in the China Intellectual Property Office, the disclosure of which is incorporated herein by reference.

BACKGROUND

1. Technical Field

The present disclosure relates to a method of calculating available output power of the wind farm, especially for a method of calculating the available output power of large-scale wind farm (above 30 MW) based on the empirical orthogonal function (EOF) in the natural state.

2. Description of the Related Art

With the rapid development of wind farm industry, the installed wind power capacity in the power network operation has reached 100 million kilowatts. There is an obvious case of brownouts with the limit of power transmission capacity and the ability of consumptive. Currently, the amount of abandoned wind power is generally calculated by annual generating capacity of wind turbines in theory, and the available output power is calculated based on the amount of abandoned wind power. However, the result is very different from the actual.

What is needed, therefore, is a method of calculating available output power of the wind farm that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

FIG. 1 shows a flow chart of one embodiment of a method of calculating available wind power of a wind farm based on EOF.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Referring to FIGURE, a method of calculating available output power of the wind farm comprises following steps:

step S10, obtaining a space vector $V_k$ by decomposing a power sequence of benchmarking wind turbines in a wind farm based on empirical orthogonal function;

step S20, calculating a typical power sequence P of benchmarking wind turbines by restoring the space vector $V_k$;

step S30, getting a total power $P_{total}$ of a feeder on which the benchmarking wind turbines is operated by enlarging a typical power of each benchmarking wind turbine in proportion according to the number of the benchmarking wind turbines operated on the feeder;

step S40, obtaining an output power $P_{estimate}$ of the wind farm by accumulating the total power $P_{total}$ of all the benchmarking wind turbines.

In step S10, the power sequence of benchmarking wind turbines in the wind farm can be obtained through the available output power of the wind farm in one year. The power sequence is defined through the number of benchmarking wind turbines and a time sequence. The number of benchmarking wind turbines is set for m, and the time sequence of each of the benchmarking wind turbines is set for n based on the available output power of the wind farm in one year. According to EOF, the wind farm can be abstracted as a space field with m-dimensional random variable X, and a plurality of samples with a capacity of n are obtained in the space field. The plurality of samples are defined as $X_i (1 \le i \le n)$. $X_i$ is an m-dimensional vector representing the benchmarking wind turbines. The $X_i$ is denoted as follows:

$$X_t = (x_{1t}, x_{2t}, \ldots, x_{mt})^T, t=1,2,\ldots,n; \quad (1)$$

According to EOF decomposition form, formula (1) can be expressed as follows:

$$X_t = \sum_{k=1}^{K} \alpha_k(t) V_k + \varepsilon_t; \quad (2)$$

wherein $V_k$ is the unknown m dimensional space vector, $\varepsilon_t$ is an m dimension error vector corresponding to the $V_k$, $\alpha_k(t)$ is a time factor, which is a weighting factor while the $k^{th}$ space vector $V_k$ represents $X_t$.

The space vector $V_k$ can be obtained by following substeps:

Step S11, obtaining a first space vector $V_1$, wherein a residual error sum of squares $E_1$ of the formula:

$$X_t = \alpha_1(t) V_1 + \varepsilon_t \quad (3)$$

is smallest.

The residual error sum of squares $E_1$ can be expressed as:

$$E_1 = \frac{1}{n}\sum_{t=1}^{n}\sum_{i=1}^{m}\varepsilon_{it}^2 = \frac{1}{n}\sum_{t=1}^{n}\varepsilon_t^T \varepsilon_t \quad (4)$$
$$= \langle \varepsilon_t^T \varepsilon_t \rangle = \langle (X_t - \alpha_1(t)V_1)^T (X_t - \alpha_1(t)V_1) \rangle$$

wherein $\alpha_1(t) = X_t^T V_1$ or $\alpha_1(t) = V_1^T X_t$, $\langle \alpha_1(t) \rangle = 0$, and $V_1^T V_1 = 1$.

The residual error sum of squares $E_1$ can further be expressed as:

$$E_1 = \langle X_t^T X_t - \alpha_1(t) X_t^T V_1 - \alpha_1(t) V_1^T X_t + \alpha_1^2(t) V_1^T V_1 \rangle \quad (5)$$
$$= \langle X_t^T X_t \rangle - \langle \alpha_1(t)\alpha_1(t) \rangle - \langle \alpha_1(t)\alpha_1(t) \rangle + \langle \alpha_1^2(t) \rangle$$
$$= \langle X_t^T X_t \rangle - \langle \alpha_1^2(t) \rangle$$

wherein $$\langle X_t^T X_t \rangle = \frac{1}{n}\sum_{t=1}^{n}\sum_{i=1}^{m} x_{it}^2 = \sum_{i=1}^{m}\frac{1}{n}\sum_{t=1}^{n} x_{it}^2,$$

is a total variance expressed as VarX which is depended on the spatial field of space research field and independent of $V_1$ and $\alpha_1(t)$, then there are:

$$E_1 = \text{Var}X - \text{Var}\alpha_1 \quad (6)$$

The $\text{Var}\alpha_1$ can be represented with X and $V_1$, thus:

$$\text{Var}\alpha_1 = \langle \alpha_1(t)\alpha_1(t) \rangle = \langle V_1^T X_t X_t^T V_1 \rangle = V_1^T \langle X_t X_t^T \rangle V_1 \quad (7)$$

wherein, the element on the i line and the j column of the $\langle X_t X_t^T \rangle$ can be expressed as $\langle x_{it} x_{jt} \rangle$ is a covariance of i and j's grid points sequence. The $\langle X_t X_t^T \rangle$ is a covariance matrix:

$$\Sigma = \langle X_t X_t^T \rangle \quad (8)$$

Furthermore, the residual error sum of squares $E_1$ can be expressed as:

$$E_1 = \text{Var}X - V_1^T \Sigma V_1 \quad (9)$$

Step S12, calculating the minimum value of $E_1$ and the $V_1$ corresponding to the minimum value of $E_1$ under the condition of $V_1^T V_1 = 1$.

The minimum value of $E_1$ and the $V_1$ can be obtained through Lagrangian method, which is expressed as:

$$F(v_{11}, v_{21}, \ldots, v_{m1}) = F(V_1) = \text{Var}X - V_1^T \Sigma V_1 + \lambda(V_1^T V_1 - 1) \quad (10)$$

Through the derivation function, then:

$$\frac{\partial F}{\partial V_1} = -2 \sum V_1 + 2\lambda V_1. \quad (11)$$

Making it to zero vector, then:

$$\Sigma V_1 = \lambda V_1 \quad (12)$$

Thus $V_1$ is an eigenvector of the covariance matrix $\Sigma$, and $\lambda$ is a Lagrange multiplier, which is an eigenvalues corresponding to the eigenvector $V_1$.

Taking the formula (12) into the formula (9):

$$\begin{aligned} E_1 &= \text{Var}X - V_1^T \sum V_1 \\ &= \text{Var}X - V_1^T \lambda V_1 \\ &= \text{Var}X - \lambda V_1^T V_1 \\ &= \text{Var}X - \lambda. \end{aligned} \quad (13)$$

In order to get the minimum $E_1$, a maximum eigenvalue $\lambda_1$ of the eigenvalue $\lambda$ is selected, which is expressed as $\lambda = \lambda_1$. Thus $V_1$ is the eigenvector corresponding to the maximum eigenvalue $\lambda_1$.

Then:

$$\begin{aligned} \text{Var}\alpha_1 &= \langle \alpha_1(t)\alpha_1(t) \rangle = \langle V_1^T X_t X_t^T V_1 \rangle = V_1^T \sum V_1 \\ &= V_1^T \lambda V_1 = \lambda_1 V_1^T V_1 = \lambda. \end{aligned} \quad (14)$$

Step S13, calculating variance contribution rate $\eta$.

A variance contribution $Q_k$ of the space vector $V_k$ is a total number of the error variance which is reduced in the space field after the space vector $V_k$ is added into the expansion of formula (9). The variance contribution $Q_k$ can be obtained:

$$Q_k = E_{k-1} - E_k = \left(\text{Var}X - \sum_{l=1}^{k-1} \lambda_l\right) - \left(\text{Var}X - \sum_{l=1}^{k} \lambda_l\right) = \lambda_k. \quad (15)$$

Furthermore, because the total variance of the space field is expressed as $$\text{Var}X = \sum_{k=1}^{m} \lambda_k,$$

thus the variance contribution rate $\eta$ is:

$$\eta = \frac{Q_k}{\text{Var}X} = \frac{\lambda_k}{\sum_{k=1}^{m} \lambda_k} \times 100\%. \quad (16)$$

The variance contribution rate $\eta$ reflects the space-based capabilities to the original description of the space field, the greater the variance contribution rate $\eta$, the closer between the space filed which is reduced from the space vector and the original space field. A typical space vector V can be determined by the variance contribution rate $\eta$.

In step S20, the threshold of the variance contribution rate $\eta$ is defined as 95% to obtain the typical space vector V. The typical space vector V under the variance contribution rate $\eta$ and the time factor $\alpha$ can be expressed as:

$$V = (b_1, b_2, b_3, \ldots b_m) \quad (17).$$

Thus the typical power sequence P of each benchmark wind turbine is:

$$P = \alpha(b_1, b_2, b_3, \ldots, b_m) \quad (18).$$

In step S30, a feeder series of the benchmarking wind turbines which are switched on in the number of m are defined as $c_1, c_2, c_3, \ldots, c_m$, thus a transposed number of the feeder series is defined as C:

$$C = (c_1, c_2, c_3, \ldots, c_m)^T \quad (19)$$

Then a total power of the feeder $P_{total}$ on which the benchmarking wind turbines is operated is expressed as:

$$\begin{aligned} P_{total} &= PC = \alpha(b_1, b_2, b_3, \ldots, b_m)(c_1, c_2, c_3, \ldots, c_m)^T \\ &= \alpha(b_1 c_1, b_2 c_2, b_3 c_3, \ldots, b_m c_m) \\ &= (\alpha b_1 c_1, \alpha b_2 c_2, \alpha b_3, c_3, \ldots, \alpha b_m c_m). \end{aligned} \quad (20)$$

In step S40, the output power $P_{estimate}$ of the whole wind farm can be obtained by summing the all components of the total power of the feeder $P_{total}$ in the formula (20):

$$P_{estimate} = \alpha b_1 c_1 + \alpha b_2 c_2 + \alpha b_3 c_3 + \ldots + \alpha b_m c_m \quad (21).$$

The method of calculating available output power of wind farm has following advantages. First, the method of calculating available output power takes advantages of the EOF in mining characteristics and generality of each benchmarking turbines, and the random sequences in the decomposition can be destructed and superposed. Second, the large calculation error in calculating the theoretical generating capacity of the wind farm in the natural state can be overcome, and the calculation accuracy of the theoretical generating capacity can be improved. Third, the method can provide an important reference to assess the economic losses of brownouts or overhaul.

Depending on the embodiment, certain of the steps of methods described may be removed, others may be added, and that order of steps may be altered. It is also to be understood that the description and the claims drawn to a method may include some indication in reference to certain steps. However, the indication used is only to be viewed for identification purposes and not as a suggestion as to an order for the steps.

It is to be understood that the above-described embodiments are intended to illustrate rather than limit the disclosure. Variations may be made to the embodiments without departing from the spirit of the disclosure as claimed. It is understood that any element of any one embodiment is considered to be disclosed to be incorporated with any other embodiment. The above-described embodiments illustrate the scope of the disclosure but do not restrict the scope of the disclosure.

What is claimed is:

1. A method of calculating available output power of wind farm comprising:
    obtaining a space vector $V_k$ by decomposing a power sequence of benchmarking wind turbines in a wind farm based on empirical orthogonal function;
    calculating a typical power sequence P of the benchmarking wind turbines by restoring the space vector $V_k$;
    getting a total power $P_{total}$ of a feeder on which the benchmarking wind turbines is operated by enlarging a typical power of each benchmarking wind turbine in proportion according to a quantity of the benchmarking wind turbines operated on the feeder;
    accumulating the total power $P_{total}$ of all the benchmarking wind turbines.

2. The method of claim 1, wherein the power sequence of benchmarking wind turbines in the wind farm is obtained through an output power of the wind farm in past one year.

3. The method of claim 2, wherein the power sequence is defined through a number of benchmarking wind turbines and a time sequence, the number of benchmarking wind turbines is set for m, and a time sequence of each of the benchmarking wind turbines is set for n.

4. The method of claim 3, wherein the wind farm is abstracted as a space field with m-dimensional random variable X, and a plurality of samples with a capacity of n is obtained in the space field.

5. The method of claim 4, wherein the plurality of samples are defined as $X_i (1 \le i \le n)$, and $X_i$ is an m-dimensional vector representing the benchmarking wind turbines denoted as:

$$X_t = \sum_{k=1}^{K} \alpha_k(t) V_k + \varepsilon_t,$$

wherein $\varepsilon_t$ is an m dimension error vector corresponding to the space vector $V_k$, $\alpha_k(t)$ is a time factor, which is a weighting factor while the $k^{th}$ space vector $V_k$ represents $X_t$.

6. The method of claim 5, wherein the space vector $V_k$ is obtained by:
    obtaining a first space vector $V_1$, wherein a residual error sum of squares $E_1$ in the formula:

$$E_1 = \text{Var}X - V_1^T \Sigma V_1 \qquad (3)$$

is smallest, wherein VarX is a total variance;
    calculating a minimum value of $E_1$ and a $V_1$ corresponding to the minimum value of $E_1$ under the condition of $V_1^T V_1 = 1$;

calculating variance contribution rate $\eta$:

$$\eta = \frac{Q_k}{\text{Var}X} = \frac{\lambda_k}{\sum_{k=1}^{m} \lambda_k} \times 100\%,$$

wherein $Q_k$ is a variance contribution of the space vector $V_k$, $\lambda_k$ is a Lagrange multiplier.

7. The method of claim 6, wherein the variance contribution $Q_k$ is a total number of the error variance reduced in the space field after the space vector $V_k$ is added into expansion of the formula of the residual error sum of squares $E_1$.

8. The method of claim 7, wherein the variance contribution $Q_k$ is obtained by:

$$Q_k = E_{k-1} - E_k = \left( \text{Var}X - \sum_{l=1}^{k-1} \lambda_l \right) - \left( \text{Var}X - \sum_{l=1}^{k} \lambda_l \right) = \lambda_k.$$

9. The method of claim 6, wherein a typical space vector V is obtained by setting the variance contribution rate $\eta$ as 95%, and the typical space vector V under the variance contribution rate $\eta$ and a time factor $\alpha$ is expressed as:

$$V = (b_1, b_2, b_3, \ldots, b_m).$$

10. The method of claim 9, wherein the typical power sequence P of each benchmark wind turbine is:

$$P = \alpha(b_1, b_2, b_3, \ldots, b_m).$$

11. The method of claim 10, wherein a feeder series of the benchmarking wind turbines which are switched on are defined as $c_1, c_2, c_3, \ldots, c_m$, and a transposed number of the feeder series is defined as C:

$$C = (c_1, c_2, c_3, \ldots, c_m)^T.$$

12. The method of claim 11, wherein the total power $P_{total}$ of the feeder on which the benchmarking wind turbines is operated is:

$$\begin{aligned} P_{total} &= PC = \alpha(b_1, b_2, b_3, \ldots, b_m)(c_1, c_2, c_3, \ldots, c_m)^T \\ &= \alpha(b_1 c_1, b_2 c_2, b_3 c_3, \ldots, b_m c_m) \\ &= (\alpha b_1 c_1, \alpha b_2 c_2, \alpha b_3, c_3, \ldots, \alpha b_m c_m). \end{aligned}$$

13. The method of claim 12, wherein accumulating the total power $P_{total}$ of all the benchmarking wind turbines is performed by summing the all components of the total power of the feeder $P_{total}$, and the output power $P_{estimate}$ is:

$$P_{estimate} = \alpha b_1 c_1 + \alpha b_2 c_2 + \alpha b_3 c_3 + \ldots + \alpha b_m c_m.$$

* * * * *